Oct. 5, 1943.      B. F. BATCHELER ET AL      2,330,805
APPARATUS FOR PACKAGING LIQUIDS
Filed April 17, 1941
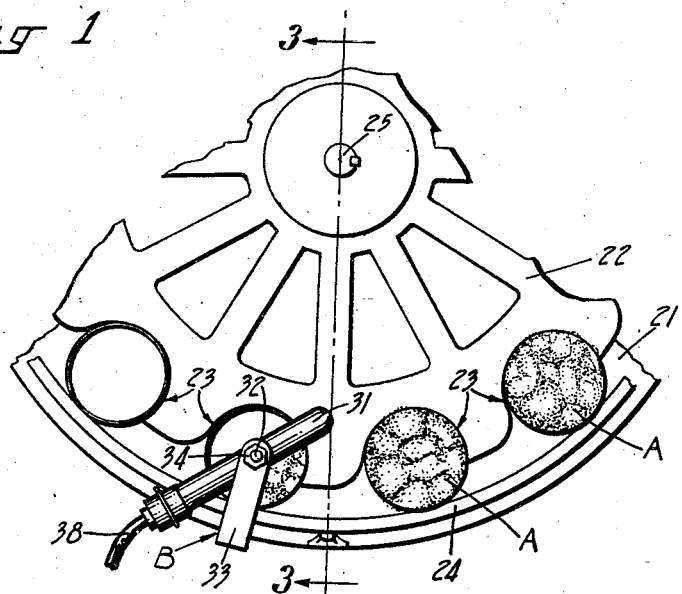
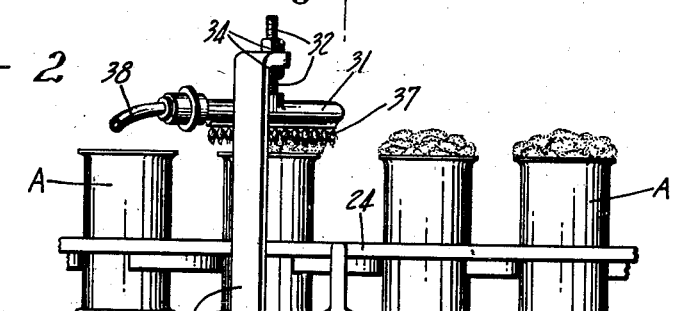
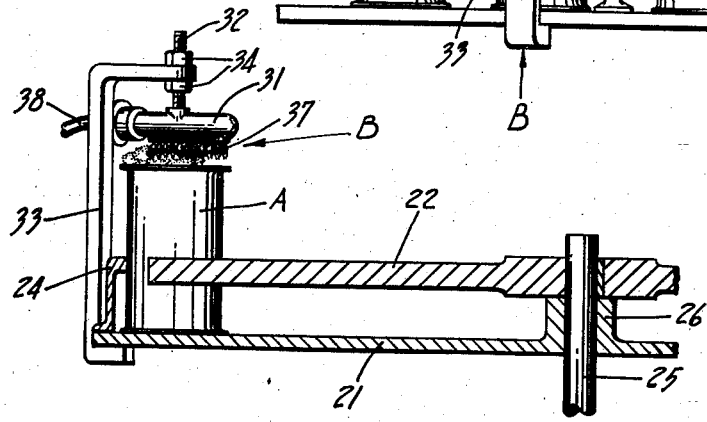
INVENTORS
Benjamin F. Batcheler
Rolf L. Peterson
BY Ivan D. Hornburgh
Chas. H. Erne
ATTORNEYS Patented Oct. 5, 1943

2,330,805

UNITED STATES PATENT OFFICE 2,330,805

APPARATUS FOR PACKAGING LIQUIDS

Benjamin F. Batcheler, Maywood, and Rolf L. Peterson, Evanston, Ill., assignors to American Can Company, New York, N. Y., a corporation of New Jersey Application April 17, 1941, Serial No. 389,096

4 Claims. (Cl. 252—361)

The present invention relates to treating liquids which readily foam upon agitation and has particular reference to an apparatus for bursting the bubbles which constitute the foam by subjecting them to heat.

In the filling of liquids such as beer, ale and other similar products into cans considerable difficulty sometimes is experienced with the foaming over of the liquid before the can is sealed. Such foaming over of the liquid wastes the product and tends to cause slack filling of the cans. In products such as beer and ale, two kinds of foam usually exist. One form of foam is of a fine, creamy texture which in the most part consists of beer and carbon dioxide. This form is desirable and preferably is retained. The other foam constitutes larger bubbles which for the most part are rich in air content. It is this latter type of foam which causes the undesirable spilling over and loss of product.

The instant invention relates to an apparatus for destroying these air bubbles in the foam to reduce the air content of the liquid and also to prevent spilling of the product prior to sealing of the can.

An object therefore of the invention is the provision of an apparatus for treating liquids which readily foam upon agitation wherein large air filled bubbles of foam are destroyed by heat immediately after the product has been filled into a can to reduce the air content of the liquid and to prevent spilling over of the product so that slack filling of the cans will be prevented.

Another object is the provision of such an apparatus wherein the bursting of the foam bubbles is effected by an open flame which may be directed into the head space of the can to expand and burst the bubbles by heat.

Numerous other objects and advantages of the invention will be apparent as it is better understood from the following description, which, taken in connection with the accompanying drawing, discloses a preferred embodiment thereof.

Refering to the drawing:

Figure 1 is a top plan view of an apparatus embodying the instant invention for treating liquids, parts being broken away;

Fig. 2 is a side elevation of the apparatus shown in Fig. 1, with parts broken away; and Fig. 3 is a sectional view taken substantially along the line 3—3 in Fig. 1.

As a preferred embodiment of the instant invention destroying air foam bubbles in a liquid subject to foaming is shown as being carried out on beer in sheet metal cans A which are propelled along a predetermined path of travel. Beer immediately upon being filled into the cans usually foams up into the head space and reaches far above the top of the can as it spills over. This foaming is primarily caused by air trapped in the liquid thereby producing large bubbles.

To prevent this spiling over, the foam is subjected to the heat of a flame which is directed down into the top of the can. The flame expands those bubbles and bursts them and thereby leaves the desirable creamy or small bubble gas filled foam in the can below the head space where it belongs. Spilling over of the product with its resultant slack filling is thereby prevented. After such a flame treatment a cover may be immediately applied to the can and sealed in place in the usual manner.

The form of apparatus shown in the drawings illustrates parts of a conventional beer filling machine. In such a machine the filled cans A are propelled along a horizontal table 21 by a rotating turret 22 having spaced pockets 23 formed in its periphery. A curved guide rail 24 secured to the table retains the filled cans in the turret pockets. The turret is mounted on a vertical shaft 25 journaled in a bearing 26 formed in the table. The shaft is rotated in any suitable manner.

The cans A thus propelled along the table 21 move through a heat zone created at a de-foaming station B. At this station there is an elongated burner 31 which is located above the path of travel of the cans along the table 21 and which preferably is disposed at an angle across the path of travel. The burner is mounted on a threaded stud 32 carried in a bracket 33 secured to the table. Locknuts 34 on the threaded stud provide means for adjusting the height of the burner so that it will be just above the top of the can as the latter passes under the burner.

The burner 31 preferably is formed with a plurality of closely spaced nozzles 37 which extend down toward the open tops of the cans passing under the burner. The burner is connected by way of a tube or pipe 38 to a suitable supply of gas. It has been found that a gas such as "Skelgas" which is a pure hydrocarbon bottled gas used for home cooking in areas beyond the city mains, gives the best results and leaves no off flavor taste or odor in the beer.

Thus when the gas issuing from the nozzles 37 is ignited a plurality of short flames uniting in a ribbon of flame along the burner, extend down into the foam on the surface of the beer in the cans passing under the burner. These flames heat the air filled foam bubbles and cause them to expand and burst. It is this bursting of these bubbles that reduces the air content of the liquid and prevents the spilling over and loss of some of the beer. Slack filling of the cans is thus prevented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for treating foam on liquids in containers, the combination of devices for supporting a liquid filled container, a heating element for creating a gaseous zone of heat, and means for reflecting movement between said supported container and said zone for subjecting the entire surface of the foam on the liquid in the container to the heat of said gaseous zone for expanding and bursting the foam bubbles to reduce the air content in the container and to prevent spilling over of the foam.

2. In a machine for treating foam on liquids in containers, the combination of a conveyor for propelling liquid filled containers along a predetermined path of travel, and a burner disposed adjacent the path of travel of said containers and having an open flame for impinging against and sweeping across the entire surface of the foam on the liquid filled containers as they move past said burner to burst the foam bubbles and reduce the air content in the container above the liquid.

3. In a machine for treating foam on liquids in containers, the combination of a conveyor for moving liquid filled containers along a predetermined path of travel, a burner disposed above and across the path of travel of the containers, and a plurality of nozzles on said burner for throwing a continuous ribbon of flame along said burner and downwardly into and across the surface of the foam on the liquid in the containers moving past said burner, said ribbon of flame heating, expanding and bursting the foam bubbles to reduce the air content of the liquid in the containers and to prevent spilling over of the foam.

4. In a machine for treating foam on liquids in containers, the combination of a heater having a plurality of fuel burning nozzles for creating a zone of heat, and a conveyor for passing a container laterally through said zone for subjecting the entire surface of the foam on the liquid in the container to the heat of said zone for expanding and bursting the foam bubbles to reduce the air content and to prevent spilling over of the foam.

BENJAMIN F. BATCHELER.
ROLF L. PETERSON.